United States Patent [19]

Martin et al.

[11] Patent Number: 5,079,318
[45] Date of Patent: Jan. 7, 1992

[54] SUBSTITUTED ACETYLENES AS RATE MODERATORS FOR RING-OPENING METATHESIS POLYMERIZATION

[75] Inventors: Andrea E. Martin, Avondale, Pa.; John F. L. Newport, Wilmington, Del.

[73] Assignee: Hercules Incorporated, Wilmington, Del.

[21] Appl. No.: 596,264

[22] Filed: Oct. 12, 1990

[51] Int. Cl.$^5$ .................................................. C08F 2/02
[52] U.S. Cl. .................................... 526/142; 526/169; 526/281; 526/283; 526/902; 264/328.2; 264/328.6

[58] Field of Search ............... 526/169, 281, 282, 283, 526/142, 902; 264/328.2, 328.6

[56] References Cited

U.S. PATENT DOCUMENTS 4,334,048  6/1982  Katz et al. ..................... 526/75 X Primary Examiner—Fred Teskin
Attorney, Agent, or Firm—Joanne W. Patterson; William S. Alexander

[57] ABSTRACT

Disclosed is a method of moderating the catalyst activation characteristics of an alkyl aluminum compound by the use of hydrocarbon substituted acetylene. Preferred compounds are phenylacetylene, hexyne-1-and hexyne-2.

11 Claims, No Drawings

5,079,318

SUBSTITUTED ACETYLENES AS RATE MODERATORS FOR RING-OPENING METATHESIS POLYMERIZATION

FIELD OF THE INVENTION

This invention relates to the polymerization of dicyclopentadiene or other polycyclic cycloolefin or mixtures thereof under the influence of a transition metal based ring opening metathesis catalyst system. Specifically, it relates to a method of controlling the rate of activation of the polymerization reaction.

BACKGROUND OF THE INVENTION

Preparation of thermoset cycloolefin polymers via metathesis catalysts is a relatively recent development in the polymer art. Klosiewicz in U.S. Pat. Nos. 4,400,340 and 4,520,181 teaches preparation of such polymers from dicyclopentadiene and other similar cycloolefins via a two-stream reaction injection molding technique wherein a first stream, including the catalyst, and a second stream, including a catalyst activator, are combined in a mix head and immediately injected into a mold where polymerization and molding to a permanently fixed shape take place simultaneously.

In the presence of a metathesis catalyst system, polymerization takes place extremely rapidly even at low temperatures. In fact, polymerization occurs so rapidly that it is not unusual for the monomer to polymerize to a solid, immobile condition before the mixed streams can be transferred to the mold. To overcome this difficulty, Klosiewicz teaches the inclusion of a reaction rate moderator in the activator stream to delay the catalyst activation until the reaction mass is totally within the mold. The total time from mixing until polymerization is substantially complete is still just a matter of seconds.

In carrying out bulk molding by metathesis polymerization of crosslinking systems, two parameters are very important. When the liquid streams are first mixed, a short induction time is observed, following which polymerization begins and a rapid viscosity build-up takes place to a point at which the material becomes too viscous to be pumped to a mold. This time interval is referred to as the gel time. When the gel time is reached, the liquid must already be in the mold. Shortly following gel time a very rapid temperature increase is observed as the remainder of the polymerization and the bulk of the crosslinking take place. The time from mixing to attainment of 100° C. is arbitrarily taken as the polymerization time (cure time) although the temperature rise continues to 175° C. and higher. The time span between gel time and cure time is desirably very short so that mold cycle time can be maintained at an economical minimum. Ideally, the ratio between gel time and cure time should approach 1.0.

It is one of the advantages of this invention that, while the gel time is extended by a highly desirable amount to allow flexibility in molding operations, the ratio of gel time to cure time moves closer to 1.0 than is observed with the conventional system. That is to say, more time is allowed for mixing the solutions and transferring the mix to a mold, but the time interval between mixing and completion of the polymerization is not increased.

Due to the extremely rapid rate of reaction of cycloolefins, even in the presence of the rate-moderated catalyst, useful polymerization has heretofore been accomplished almost exclusively by the reaction injection molding (RIM) process using the two-stream process of Klosiewicz. Even in RIM processes, the short gelation times limit the application to relatively small items and to relatively non-detailed molds with a minimum of sharp corners which tend to trap pockets of air if the mold is filled too rapidly or if the viscosity of the polymerization mass builds up so rapidly that the gelled monomer does not flow easily into corners or around blocked-out sections. The polymerization mass cannot readily be employed in thermoset molding techniques such as pour, rotational and resin transfer (RTM) molding applications which require relatively long mold filling times.

It has been found possible (see Leach U.S. Pat. No. 4,458,037) to extend the gelation time to as much as ten minutes at room temperature by use of a dialkyl aluminum iodide activator moderated by di-n-butyl ether. When heated to 80° C., this mixture polymerizes in about 15 seconds. This system is also unsatisfactory in procedures where filling of the mold takes place slowly since the mold temperature must be held low enough during the filling operation that the reaction mixture remains fluid until the mold is entirely filled and then raised to the reaction temperature. For commercially practical production rates to be attained, the differential between mold filling temperature and polymerization reaction temperature must be smaller than is possible using the catalyst of Leach.

Minchak, U.S. Pat. No. 4,426,502 teaches the use of a catalyst system based on an alkyl ammonium molybdate and an alkoxyalkyl aluminum halide. This system not only delays the initiation of the reaction for a significant time, but requires heat to be applied to the mold to trigger the polymerization.

Nelson, in U.S. Pat. No. 4,727,125 teaches moderating the reaction with certain specified amines which likewise give very substantial delays to allow for filling large molds and for using molding techniques other than RIM. As reported in Klosiewicz, U.S. Pat. No. 4,400,340 and described hereinabove, the metathesis polymerization of dicyclopentadiene (DCPD) is carried out by a technique wherein at least a first reactant stream containing DCPD and a metathesis catalyst component is combined in a mix head with a second reactant stream containing DCPD and a metathesis catalyst activator and a rate moderator. The mixture is then injected into a mold where the reaction to form a crosslinked dicyclopentadiene polymer in a predetermined, desired shape takes place. This same technique is taught by Minchak, Leach, and Nelson in their later patents, either with DCPD or other norbornene-type polycyclic cycloolefins.

In the preferred embodiments taught by Klosiewicz, the metathesis catalyst is tungsten hexachloride and the preferred catalyst activators are alkyl aluminum halides moderated by an alcohol, ester, ketone, nitrile or alcohol.

The tungsten or molybdenum catalyst is solubilized by complexing it with a phenolic compound so that a homogeneous catalyst/DCPD solution can be prepared. Also, in order to prevent premature ionic polymerization of the DCPD monomer in which the catalyst is to be dissolved, the catalyst component is stabilized by reacting it with a chelating agent or a Lewis base. Such chelants as acetylacetone, dibenzoyl methane, and alkylacetonates or Lewis bases such as benzonitrile or tetrahydrofuran can be employed as the stabilizer. The chelants and, particularly, acetylacetone (2,4-pentanedione), are preferred stabilizers. Stabilization of the catalyst prevents ionic polymerization, giving the solution an almost indefinite shelf life in the absence of any activating mechanism taking place.

For a full description of catalyst preparation, reference can be had to Martin U.S. Pat. No. 4,696,985.

While the technique of Klosiewicz works very well for a great number of applications and has been the technique employed for virtually all of the market penetration made to date by poly(dicyclopentadiene), there are applications in which a degree of modertion intermediate those of Klosiewicz at one extreme and Minchak, Leach, and Nelson at the other is desirable.

BRIEF DESCRIPTION OF THE INVENTION

Now, in accordance with this invention, it has been found that such an intermediate degree of moderation can be effected by employing a hydrocarbon-substituted acetylene in combination with the metathesis catalyst system.

It is known in the art to use phenylacetylene as an activator (sometimes referred to as a co-catalyst) for tungsten hexachloride and other unstabilized metathesis catalysts. However, when used alone phenylacetylene will not activate a stabilized tungsten or molybdenum catalyst as it apparently is not able to remove the stabilizing group.

Briefly stated, the present invention is an improvement in the method of polymerizing polycyclic cyloolefins wherein a first reactant stream containing at least one polycyclic polyolefin and a stabilized metathesis polymerization catalyst and a second reactant stream containing at least one polycyclic cycloolefin and an alkyl aluminum catalyst activator are combined and substantially immediately transferred to a mold where polymerization and shaping take place, which improvement comprises including in said first reactant stream a hydrocarbon-substituted acetylene in an amount equivalent to about 0.05 to 2 mol/mole of stabilized catalyst.

DETAILED DESCRIPTION OF THE INVENTION

The method of this invention is applicable to the bulk polymerization of polycyclic cycloolefins (also sometimes referred to in the art as norbornene-type monomers) generally. Monomers of this class include, e.g., norbornene, substituted norbornenes, e.g., methyl norbornene or ethylidene norbornene, norbornadiene, tetracyclododecene, methyl tetracyclododecene, tetracyclododecadiene, dicyclopentadiene, dihydrodicyclopentadiene, tricyclopentadiene and mixtures of these compounds. Of these, polymers and copolymers based on dicyclopentadiene as the principal monomer are particularly contemplated as these materials have found numerous commercial applications and since they are crosslinked in the metathesis reaction, they must, of necessity, be prepared by reaction molding. The preferred polycyclic cycloolefin mixture contains at least 50% dicyclopentadiene and preferably at least 97% dicyclopentadiene.

The term "stabilized metathesis polymerization catalyst" is intended to mean any catalyst capable of initiating ring-opening metathesis polymerization of a polycyclic cycloolefin when activated by an alkyl aluminum compound, or of initiating ionic polymerization in absence of a metathesis catalyst activator, but which is chemically prevented from initiating ionic polymerization. Typical are the complexes of tungsten and molybdenum halides such as tungsten hexachloride, tungsten oxytetrachloride, molybdenum pentachloride and molybdenum oxytrichloride mentioned hereinabove.

A broad range of alkyl aluminum compounds can be used as the catalyst activator in the second reactant liquid stream. These include the dialkyl aluminum halides, the alkyl aluminum dihalides and the aluminum trialkyls. Preferred are the trialkyl aluminums and dialkyl aluminum halides wherein the alkyl groups have 1 to about 12 carbon atoms. A particularly preferred species is a mixture of tri-n-octyl-aluminum and, dioctylaluminum iodide. The activator is readily soluble in the polycyclic cycloolefin.

The acetylene compound which can be used as the rate moderator in this invention is a hydrocarbon-substituted acetylene of the formula $R_1-C{\equiv}C-R_2$. $R_1$ in this formula can be phenyl, or a 2 to 6 carbon alkyl group while $R_2$ can be H or a 2 to 6 carbon alkyl group. Exemplary of such compounds are phenylacetylene, butyne-1, pentyne-1, hexyne-1, hexyne-2, octyne-1 or octyne-2. The alkyl group can be straight or branched. The preferred compounds are phenylacetylene, hexyne-1 and hexyne-2.

Given the known activity of acetylene compounds as metathesis catalyst activators and activation enhancers, it was quite unexpected to find that, when employed in conjunction with the alkyl aluminum compounds, they function in just the opposite manner, i.e., they delay the activation effect of the alkyl aluminum compound.

The acetylene compounds used as rate moderators according to this invention are reactive with aluminum alkyls. Accordingly, the moderator must be added to the reacting system either as a third stream or as a component of the catalyst stream. Preferably it will be added as a component of the catalyst stream since it is economically preferred to operate the system with a minimum number of streams being combined at the point of mixing.

The acetylene compound is added to the catalyst stream at relatively low concentrations for best results. Thus, a mole ratio of about 0.05 to 2 mole acetylene compound per mole of tungsten or molybdenum in the catalyast, and, more preferably, about 0.05 to about 0.25 is preferred.

The invention is illustrated in the following examples which are not intended to be limiting as to the scope of the invention.

PREPARATION OF CATALYST CONCENTRATE

Under an inert atmosphere (glove bag), a quantity of $WCl_6$ is weighed into a glass vessel (pop bottle) containing a magnetic stirring bar. The bottle is capped and removed from the glove bag. Next, a sufficient amount of dry toluene (or other aromatic solvent) is added to generate a 0.5M slurry. With stirring, 0.25 equivalent of t-butanol (based on tungsten) is slowly added. The HCl that is generated is swept from the vessel by a slow nitrogen sparge. After at least one hour, during which time the stirring and sparging is continued, 1.2 equivalent of nonylphenol (based on tungsten) is slowly added. The mixture is again allowed to stir for at least one hour while the sparge is continued. Finally, 2.0 equivalent of acetylacetone (2,4 pentanedione) is added, and the mixture is allowed to stir and sparge for several hours. Any solvent lost during the sparging is made up, resulting in a 0.5M solution of a stabilized metathesis catalyst in toluene.

PREPARATION OF ACTIVATOR CONCENTRATE

Under an inert atmosphere, a vessel is charged with the desired amount of tri-n-octylaluminum (TNOA). Next is charged the appropriate amount of di-n-octylaluminum iodide (DOAI), to give a mixture that is 85 mole % TNOA and 15 mole % DOAI. To that is carefully added 1 equivalent (based on total aluminum) of diglyme (bis-2-methoxyethyl ether) to control the evolution of heat during the exothermic reaction. The mixture is then diluted with the appropriate amount of dicyclopentadiene (DCPD) or an inert solvent such as toluene to give a 1.0M solution in aluminum.

EXAMPLES 1 TO 4

Four 5.0 ml aliquots of 0.5M catalyst solution were transferred to 10 ml serum vials under nitrogen. Phenylacetylene (PA) in predetermined amount was added to each vial as recorded in Table 1 below. Solutions were allowed to sit for several hours before use.

Polymerizations were carried out in test tubes inerted with $N_2$ stoppered with an appropriate size stopple secured with an electrical tie. To each test tube was charged 5.0 ml of DCPD and 0.04 ml of treated catalyst solution. A thermocouple was inserted and the mixtures were heated to 33°±2° C. With vigorous shaking 0.55 ml of 1.0M activator was added. Gel times were estimated visually by an experienced operator recording time when the material ceased to flow readily. Cure time was measured by a thermocouple and a stopwatch. Results are recorded in Table 1.

TABLE 1

| Example # | PA/W | Gel Time | Cure Time | Gel/Cure Ratio | Residual DCPD |
|---|---|---|---|---|---|
| Control 1 | 0.00 | 5 | 28.0 | 0.18 | 3.38 |
| 1. | 0.05 | 13 | 35.5 | 0.36 | 1.87 |
| 2. | 0.10 | 16 | 38.5 | 0.42 | 2.12 |
| 3. | 0.25 | 19 | 55.0 | 0.35 | 1.99 |
| 4. | 0.50 | 29 | 99.5 | 0.29 | 2.07 |

The data in Table 1 clearly show the extended gel time and the generally improved gel/cure ration caused by use of phenylacetylene.

EXAMPLES 5 AND 6

Another series of polymerizations was carried out using a laboratory RIM molding machine to prepare plaques for physical property testing.

In these runs, the same catalyst and activator were employed as were employed in Examples 1 to 4. In addition, in each solution, the DCPD was diluted with 3 wt % of ethylidene norbornene (ENB) as a freezing point depressant. Physical properties of these polymers are recorded in Table 2.

TABLE 2

| Example # | PA/W | Flex Modulus kpsi | kg/cm² | Flex Strength kpsi | kg/cm² | HDT °C. | Tg °C. | Resid DCPD |
|---|---|---|---|---|---|---|---|---|
| Control 2 | 0 | 311.6 | 21,900 | 11.5 | 807 | 99.5 | 134 | 2.94 |
| 5 | 0.1 | 311.6 | 21,900 | 12.0 | 834 | 102 | 138 | 3.72 |
| 6 | 0.25 | 321.6 | 22,600 | 12.2 | 860 | 100 | 137 | 3.17 |

EXAMPLES 7–10

A series of runs similar to examples 5 and 6 was carried out wherein rubber was also added to the DCPD as a viscosifier for the liquids and an impact strength modifier for the resultant polymer. ENB was added as a freezing point depressant as described in Examples 5 and 6. Physical properties of these materials were determined and are reported in Table 3. In Control 3 and in Examples 7 and 8, the rubber is 3% by weight of ethylene-propylene-diene rubber (EPDM) (Royalene 301T by Uniroyal) and 0.75 wt. % ethylene-propylene rubber (EPR) (Epsyn 901 by Copolymer Rubber Corp.) and Control 4 and in Examples 9 and 10, the rubber was 8% Kraton 1107SIS by Shell Oil Co.

It is apparent from the Examples 5 to 10 that the use of acetylene compound does not materially affect the physical properties of polymers made therewith.

TABLE 3

| Example # | PA/W | Flex Modulus kpsi | kg/cm² | Flex Strength kpsi | kg/cm² | Notched Izod ++-lb/in | Resid DCPD % |
|---|---|---|---|---|---|---|---|
| Control 3 | 0 | 276.1 | 19400 | 9.6 | 675 | 10.94 | 2.56 |
| 7 | 0.1 | 287.4 | 20200 | 10.3 | 724 | 9.74 | 1.74 |
| 8 | 0.25 | 277.5 | 19500 | 9.9 | 697 | 10.4 | 2.79 |
| Control 4 | 0 | 253.3 | 17800 | 8.3 | 568 | 9.02 | 2.69 |
| 9 | 0.1 | 264.7 | 18600 | 9.3 | 652 | 8.79 | 1.16 |
| 10 | 0.25 | 250.4 | 17600 | 8.9 | 622 | 8.55 | 2.02 |

EXAMPLES 11 AND 12

Experiments corresponding to example 3 were run wherein hexyne-1 and hexyne-2 were employed as the rate moderator at a ratio of 0.2 to 1 acetylene to W. Results are recorded in Table 4.

TABLE 4

| Example # | Moderator | Gel Time | Cure Time | Gel/Cure |
|---|---|---|---|---|
| 11 | hexyne-1 | 15 secs | 38 | 0.39 |
| 12 | hexyne 2 | 10 | 32 | 0.31 |

EXAMPLES 13

In this example, polymers were prepared using a laboratory-scale RIM machine adapted for meausring gel time and cure time precisely.

Approximately 800 ml each of an activator component and a catalyst component were prepared and charged into respective day tanks of the RIM machine. The activator component was made up of 794.7 grams of DCPD containing 3.5% Royalene 301T EPDM rubber and 0.25% Epsyn 901 EPR and 3% ENB (all based on the total weight of solution) and 36 ml of 0.5M tri-n-octylaluminum/dioctylaluminum/diglyme solution in toluene. The catalyst component was comprised of 816.26 grams of the DCPD/elastomer/EPN solution hereinabove described, 12.3 ml of the standard catalyst, 32 grams of a phenolic antioxidant (Irganox 1035 from Ciba Geigy Corp.), 1.4 ml of phenylacetylene and 0.59 ml of dichlorodiphenylmethane (0.5 mole/mole of W).

The day tank temperature was adjusted and liquid temperatures allowed to equilibrate. One plaque was then cast to ensure that the liquids would mold properly, after which the mold was detached from the mixhead and the mixhead discharge line was inserted into a bottle fitted with a rotating spindle and a thermocouple. Triplicate shots of the liquid were fed into bottles and the gel and cure times were determined. In this case, gel time is measured as the time when the polymerization liquid climbs the shaft of the rotating spindle. Cure time is $T_{100}$ as before.

Gel and cure times were measured with liquid temperature at 35° C., 50° C. and 70° C. Results are recorded in Table 5.

TABLE 5

| Liquid Temp. | Gel Time (sec) | Cure Time (sec) |
|---|---|---|
| 35° C. | 243 | 10 min |
| 50° C. | 128 | 377 |
| 70° C. | 47 | 135 |

EXAMPLE 14

Following the procedures of Example 13, a series of polymerizations was run to demonstrate the effect of varying the phenylacetylene/W. In this case the DCPD component of each of the liquids omitted the ENB and the antioxidant level was decreased to 2% by weight based on DCPD component.

The increase in the gel time with increased phenylacetylene/W ratio is apparent in the data recorded in Table 6. All data are the average of three polymerizations.

TABLE 6

| Liquid Temp. | Gel Time (sec) | Cure Time (sec) |
|---|---|---|
| No PA | | |
| 35° C. | 8.5 | 18.5 |
| 50° C. | 4.3 | 15.3 |
| 70° | 1.8 | 3.3 |
| 0.25 PA/W | | |
| 35° C. | 16.2 | 37.3 |
| 50° C. | 11.0 | 32.3 |
| 70° C. | 4.2 | 17.5 |
| 0.50 PA/W | | |
| 35° C. | 28.8 | 88.2 |
| 50° C. | 15.7 | 57.0 |
| 70° C. | 6.5 | 27.7 |

The results shown in Tables 5 and 6 indicate that gel and cure times are controllable over a wide range by changing the liquid temperatures and/or the concentration of phenylacetylene employed. Gel times sufficient for molding techniques which employ large volumes of liquid and which require long mold filling times can be achieved thus allowing use of molding techniques other than RIM.

In carrying out the process according to this invention, other processing refinements employed in the presently practiced commercial technique can be used. For example, additives to reduce the unreacted monomer content can be present. Also fillers and reinforcing aids can be added, as well as antioxidants and stabilizers.

These additives have to be added to the starting solutions, since they cannot be added after the solutions are polymerized. Such additives may be added in either the catalyst stream or the activator stream. The additives should be substantially unreactive with the highly reactive catalyst or activator component in the solutions and they must of course have substantially no inhibitory action to polymerization. If a reaction between the additive and the catalyst component or the activator component is unavoidable, but does not essentially inhibit the polymerization, the additives can be mixed with the monomers to prepare a third solution, and the third solution can be mixed with the first and/or second solutions immediately before polymerization. When the additive is a solid filler having interstices between particles which can be filled sufficiently with the mixed solutions immediately before or during the polymerization reaction, the mold can be filled with the filler prior to charging the reactive solutions into the mold.

In order to decrease the residual monomer content, a small amount of an active halogen compound such as trichloromethyltoluene, ethyl trichloroacetate, dichlorodiphenylmethane or isophthaloyl chloride or an acid anhydride such as benzoic anhydride may be added.

A variety of additives may be included in the formulations of the present invention to improve or to maintain characteristics of molded articles prepared therewith. Additives include fillers, pigments, antioxidants, light stabilizers, flame retardants, macromolecularr modifiers and the like.

The reinforcing materials or fillers used as additives can improve flexural modulus of the polymer. These include glass fibers, mica, carbon black, wollastonite and the like.

The molded polymer articles used in the present invention preferably contain an antioxidant. Preferably, a phenolic or amine antioxidant is added to the solution in advance.

Examples of the antioxidants include 2,6-t-butyl-p-cresol, N,N-diphenyl-phenylenediamine, and tetrakis[methylene(3,5-di-t-butyl-4-hydroxycinnamate)]methane.

We claim:

1. In a process wherein a first reactant stream containing at least one polycyclic polyolefin and a stabilized metathesis polymerization catalyst and a second reactant stream containing at least one polycyclic cycloolefin and an alkyl aluminum catalyst activator are combined and transferred to a mold wherein polymerization and shaping take place, the improvement which comprises including in said first reactant stream a hydrocarbon-substituted acetylene in an amount equivalent to about 0.05 to 2 moles/mole of stabilized catalyst, said hydrocarbon-substituted acetylene having the formula $R_1-C\equiv C-R_2$, where $R_1$ is phenyl or a 2-6 carbon alkyl group and $R_2$ is H or a 2-6 carbon alkyl group.

2. The process according to claim 1 wherein the polycyclic cycloolefin is at least 50% by weight dicyclopentadiene.

3. The process according to claim 2 wherein the hydrocarbon-substituted acetylene compound is phenylacetylene, hexyne-1 or hexyne-2.

4. The process according to claim 1 wherein the metathesis polymerization catalyst is a tungsten halide stabilized with acetylacetone.

5. The process according to claim 4 wherein the polycyclic cycloolefin comprises at least 50% by weight of dicyclopentadiene.

6. The process of claim 5 wherein the alkylaluminum catalyst activator is an alkylaluminum halide.

7. The process of claim 6 wherein the alkylaluminum catalyst activator is a mixture of tri-n-octylaluminum and dialkylaluminum iodide in amolar ratio of about 85/15.

8. The process of claim 7 wherein the polycyclic cycloolefin comprises a* least 97% dicyclopentadiene.

9. The process of claim 5 wherein the alkylaluminum catalyst activator is an alkylaluminum halide.

10. The process of claim 9 wherein the alkylaluminum catalyst activator is a mixture of tri-n-octylaluminum and dialkylaluminum iodide in a molar ratio of about 85/15.

11. The process of claim 10 wherein the polycyclic cycloolefin comprises at least 97% dicyclopentadiene.

* * * * *

UNITED STATES PATENT AND TRADEMARK OFFICE
CERTIFICATE OF CORRECTION

PATENT NO. : 5,079,318

DATED : January 7, 1992

INVENTOR(S) : Andrea E. Martin and John F. L. Newport

It is certified that error appears in the above-identified patent and that said Letters Patent is hereby corrected as shown below:

Col. 4, line 45, "catalyast" should read -- catalyst --;

Col. 5, line 67, "ration" should read -- ratio --;

Col. 6, line 63, "meausring" should read -- measuring --;

Col. 7, line 35, after "phenylacetylene/W" insert the word -- ratio --; and

In the Claims, Col. 10, line 1, "amolar" should read -- a molar --.

Signed and Sealed this

Twenty-third Day of March, 1993

Attest:

STEPHEN G. KUNIN

*Attesting Officer*     *Acting Commissioner of Patents and Trademarks*